United States Patent
Grothaus et al.

(10) Patent No.: US 9,453,753 B2
(45) Date of Patent: Sep. 27, 2016

(54) FUEL LEVEL METER FOR INDUSTRIAL VEHICLES

(75) Inventors: Brent J. Grothaus, Delphos, OH (US); Nicholas J. Stein, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 449 days.

(21) Appl. No.: 12/725,531

(22) Filed: Mar. 17, 2010

(65) Prior Publication Data

US 2010/0238013 A1 Sep. 23, 2010

Related U.S. Application Data

(60) Provisional application No. 61/161,311, filed on Mar. 18, 2009.

(51) Int. Cl.
*B60Q 1/00* (2006.01)
*G01F 23/18* (2006.01)
(Continued)

(52) U.S. Cl.
CPC ....... *G01F 23/185* (2013.01); *B60K 15/03006* (2013.01); *G01F 23/14* (2013.01); *B60K 2015/03217* (2013.01)

(58) Field of Classification Search
CPC . F02B 43/00; F02D 19/023; F02M 21/0215; F02M 21/02; G01F 23/185; G01F 23/14; B60K 15/03006
USPC ................ 340/450.1, 450.2, 450.3
See application file for complete search history.

(56) References Cited

U.S. PATENT DOCUMENTS 2,328,881 A * 9/1943 Saunders ................. G06G 1/12
235/61 B
2,933,076 A * 4/1960 Spencer ................. F02M 21/00
123/528

(Continued)

FOREIGN PATENT DOCUMENTS

| EP | 1090795 A1 | 4/2000 |
| KR | 20-2000-0004428 | 3/2000 |
| WO | 03029719 A1 | 4/2003 |

OTHER PUBLICATIONS

Ho Jin Kong; International Search Report and Written Opinion of the International Searching Authority; International Application No. PCT/US2010/027594; Oct. 28, 2010; Korean Intellectual Property Office.

(Continued)

*Primary Examiner* — Jennifer Mehmood
*Assistant Examiner* — Rufus Point
(74) *Attorney, Agent, or Firm* — Stevens & Showalter, LLP (57) ABSTRACT

The present application discloses a method for measuring pressurized liquid fuel level in a fuel tank used on a vehicle comprising measuring the pressure of the fuel to generate a pressure signal and measuring the temperature of the fuel to generate a temperature signal. A fuel level signal is determined from the pressure signal and the temperature signal and changes in the fuel level signal are determined over time. A first point of the fuel level signal indicating approaching emptying of the tank is identified when changes in the fuel level signal exceed a given value and the approaching emptying of the tank is signaled to an operator of the vehicle in response to identifying the first point. Also disclosed is a fuel level meter system comprising a display comprising a series of at least three light sources arranged in a generally vertical column with a bottommost one of the at least three light sources being of a first color and light sources above the bottommost one of the at least three light sources being of a second color.

22 Claims, 12 Drawing Sheets

(51) Int. Cl.
*B60K 15/03* (2006.01)
*G01F 23/14* (2006.01)

(56) References Cited

U.S. PATENT DOCUMENTS

| | | | | |
|---|---|---|---|---|
| 2,995,922 | A * | 8/1961 | Firth | G01N 7/00 73/19.05 |
| 3,723,964 | A * | 3/1973 | Lace | F01M 1/18 340/449 |
| 3,890,832 | A * | 6/1975 | Nick | G06G 7/64 73/114.15 |
| 3,896,773 | A * | 7/1975 | Edison | F02D 41/32 123/485 |
| 4,122,667 | A * | 10/1978 | Hosaka | F02C 9/32 60/39.091 |
| 4,252,097 | A * | 2/1981 | Hartford | F02D 41/32 123/381 |
| 4,272,995 | A * | 6/1981 | Weistra | G01F 1/64 73/861.09 |
| 4,379,332 | A * | 4/1983 | Busser | F02D 41/26 123/480 |
| 4,773,260 | A * | 9/1988 | Ohno | F02M 37/0094 340/450.2 |
| 4,840,056 | A | 6/1989 | Fernandez et al. | |
| 4,887,068 | A * | 12/1989 | Umehara | B60R 16/0232 340/450.3 |
| 4,972,710 | A * | 11/1990 | Uhlarik | G01M 3/3245 73/292 |
| 5,146,783 | A * | 9/1992 | Jansche | G01F 23/18 73/301 |
| 5,159,898 | A * | 11/1992 | Hartel | F02D 19/0605 123/1 A |
| 5,251,482 | A | 10/1993 | Bates et al. | |
| 5,305,639 | A | 4/1994 | Pontefract | |
| 5,361,059 | A * | 11/1994 | Hoffman | G07C 5/0825 340/438 |
| 5,379,637 | A * | 1/1995 | Abowd | G01F 23/18 73/1.73 |
| 5,459,666 | A * | 10/1995 | Casper | G01C 23/00 340/973 |
| 5,542,392 | A | 8/1996 | Povinger | |
| 5,611,316 | A * | 3/1997 | Oshima | F02M 21/0224 123/494 |
| 5,616,031 | A * | 4/1997 | Logg | A63F 13/005 345/426 |
| 5,623,907 | A | 4/1997 | Cotton et al. | |
| 5,686,895 | A * | 11/1997 | Nakai | B60L 3/12 340/439 |
| 5,815,072 | A * | 9/1998 | Yamanaka | B60K 35/00 340/438 |
| 5,829,418 | A | 11/1998 | Tamura et al. | |
| 5,859,365 | A * | 1/1999 | Kataoka | G01F 23/14 73/149 |
| 5,899,194 | A * | 5/1999 | Iwatsuki | F02B 43/00 123/490 |
| 6,087,815 | A * | 7/2000 | Pfeifer | B25F 5/00 323/282 |
| 6,134,805 | A * | 10/2000 | Chowdhury | F17C 7/02 34/403 |
| 6,336,362 | B1 | 1/2002 | Duenas | |
| 6,349,252 | B1 | 2/2002 | Imanishi et al. | |
| 6,502,461 | B2 | 1/2003 | Keller | |
| 6,635,371 | B2 * | 10/2003 | Kawasumi | H01M 8/0612 429/423 |
| 6,742,282 | B2 * | 6/2004 | Chowdhury | F17C 7/02 34/402 |
| 6,785,616 | B2 * | 8/2004 | Lung | G01H 1/00 702/138 |
| 6,823,738 | B1 | 11/2004 | Wlodarczyk et al. | |
| 6,872,071 | B1 * | 3/2005 | Durst | F23D 14/60 137/92 |
| 6,907,371 | B2 | 6/2005 | Klinger et al. | |
| 6,915,692 | B2 | 7/2005 | Ricco et al. | |
| 6,957,171 | B2 | 10/2005 | White et al. | |
| 7,237,203 | B1 | 6/2007 | Kuenzner | |
| 7,401,625 | B2 | 7/2008 | Casier | |
| 7,716,993 | B2 * | 5/2010 | Ozawa | G01F 1/383 137/12 |
| 7,934,490 | B2 * | 5/2011 | Kurata | F02D 41/406 123/491 |
| 7,940,165 | B1 * | 5/2011 | Oxley | B60K 15/03006 340/438 |
| 8,005,603 | B2 * | 8/2011 | Fisher | F02D 31/002 123/527 |
| 8,590,515 | B2 * | 11/2013 | Young | F02D 41/0025 123/27 GE |
| 9,334,069 | B1 * | 5/2016 | Honda | B64G 1/402 |
| 2002/0083723 | A1 * | 7/2002 | Demuth | B60H 1/00978 62/129 |
| 2002/0174893 | A1 * | 11/2002 | Chowdhury | F17C 13/026 137/113 |
| 2002/0178810 | A1 * | 12/2002 | Lorenzen | G01F 23/38 73/313 |
| 2003/0084589 | A1 * | 5/2003 | Chowdhury | F17C 7/02 34/403 |
| 2004/0010382 | A1 * | 1/2004 | Lung | G01H 1/00 702/34 |
| 2004/0162664 | A1 * | 8/2004 | Chatfield | F02D 11/105 701/104 |
| 2006/0167609 | A1 | 7/2006 | Brouart et al. | |
| 2006/0243345 | A1 | 11/2006 | Lease | |
| 2007/0245707 | A1 * | 10/2007 | Pashley | F02C 9/26 60/39.27 |
| 2009/0205396 | A1 * | 8/2009 | Zak | B21D 26/08 72/430 |
| 2010/0163004 | A1 * | 7/2010 | Kurata | F02D 41/406 123/491 |
| 2010/0192890 | A1 * | 8/2010 | Brooks | F02B 29/0412 123/1 A |
| 2010/0238013 | A1 * | 9/2010 | Grothaus | B60K 15/03006 340/450.2 |
| 2010/0280740 | A1 * | 11/2010 | Oe | B60K 6/445 701/102 |
| 2011/0270502 | A1 * | 11/2011 | Demougeot | F02C 7/224 701/100 |

OTHER PUBLICATIONS

Babin, Giles; Examination Report; Canadian Patent Application No. 2,754,153; Jan. 22, 2016; Canadian Intellectual Property Office; Quebec, Canada.

* cited by examiner

FUEL LEVEL METER FOR INDUSTRIAL VEHICLES

CROSS-REFERENCE TO RELATED APPLICATIONS

This application claims priority to U.S. Provisional Patent Application No. 61/161,311, filed on Mar. 18, 2009 and entitled FUEL LEVEL METER FOR INDUSTRIAL VEHICLES, the contents of which are incorporated herein by reference in their entirety.

BACKGROUND OF THE INVENTION

The present invention relates to industrial vehicles including forklift trucks and the like that are operated from liquid fuel contained within fuel tanks on the vehicles. More particularly, the present invention relates to measuring pressurized liquid fuel levels in fuel tanks used on such vehicles and indicating to operators of the vehicles when the tanks are approaching empty and approximately how much operating time remains. A common liquid fuel is liquid propane (LP) which is used to power many forklift trucks. Accordingly, the invention will be described with reference to forklift trucks which use LP as fuel. It is noted however, that the present invention is equally applicable to other industrial vehicles that use liquid fuel and liquid fuels other than LP including, for example, natural gas (NG). For ease of description, "propane," "LP" or "fuel" will be used herein to refer to all currently available liquid fuels and liquid fuels that may become available in the future.

Knowing when an energy supply is nearing exhaustion and the corresponding operating time remaining is important to operators since a vehicle may be operated well away from an area where fuel can be replenished. Typically, industrial vehicles which exhaust their fuel supplies are difficult if not impossible to move and, if not near or in a refueling area, it may be difficult and time-consuming to refuel them. Accordingly, the remaining fuel and run time is important information particularly to newer, less experienced operators.

SUMMARY OF THE INVENTION

The present application discloses a method for measuring pressurized liquid fuel level in a fuel tank used on a vehicle comprising measuring the pressure of the fuel to generate a pressure signal and measuring the temperature of the fuel to generate a temperature signal. A processor determines a fuel level signal from the pressure signal and the temperature signal and monitors changes in the fuel level signal over time. A first point of the fuel level signal indicating approaching emptying of the tank is identified when changes in the fuel level signal exceed a given value and the approaching emptying of the tank is signaled to an operator of the vehicle in response to identifying the first point.

The present application also discloses a fuel level meter system comprising a display comprising a series of at least three light sources arranged in a generally vertical column with a bottommost one of the at least three light sources being of a first color and light sources above the bottommost one of the at least three light sources being of a second color.

DETAILED DESCRIPTION OF THE INVENTION

Figure 1:
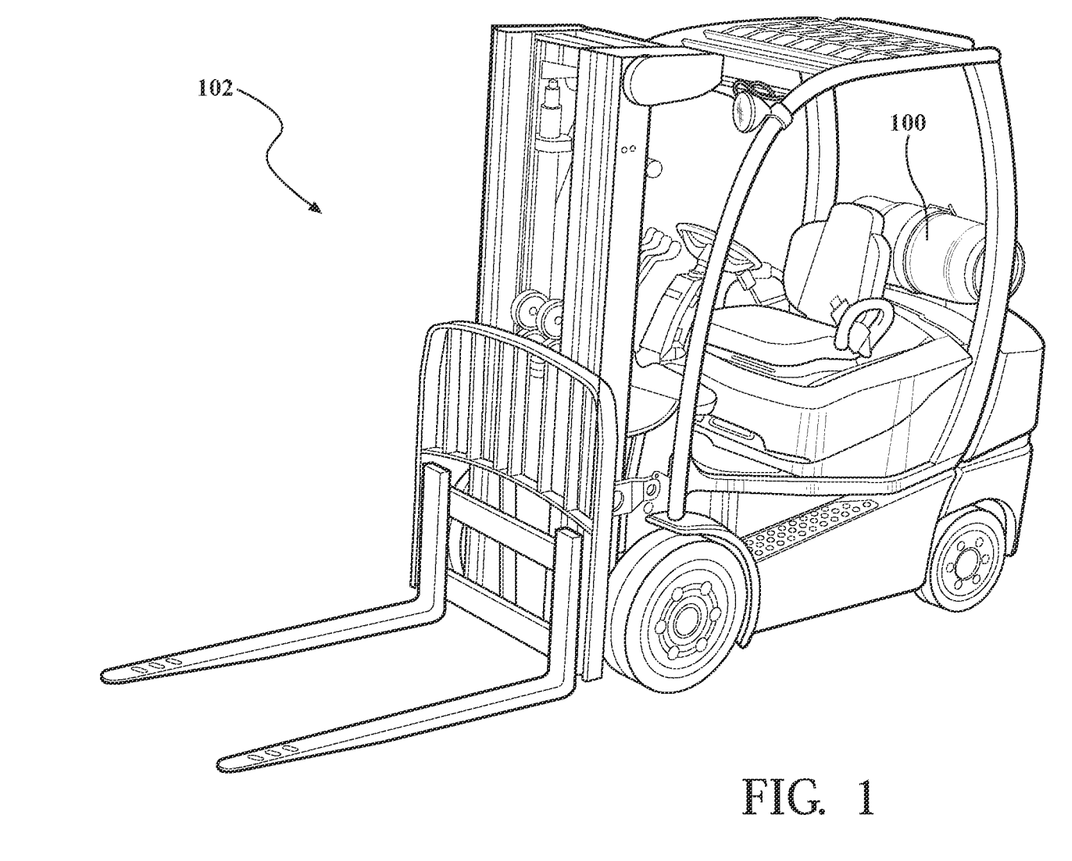
FIG. 1 is a perspective view of a lift truck powered by liquid fuel.

The temperature and pressure of liquid fuel, commonly liquid propane (LP), inside a fuel tank 100 used on a vehicle, such as a lift truck 102 shown in FIG. 1, is monitored in the fuel level meter system of the present application. Since the fuel level meter system of the present application is equally applicable to other liquid fuels including natural gas (NG), for ease of description, propane, LP or fuel will be used herein to refer to any and all appropriate liquid fuels. Fuel temperature and pressure monitoring can be performed by using a sensor. Conveniently, the sensor 104 (see FIG. 2) is a dual sensing (i.e., pressure and temperature) sensor, such as the GEMS 3202H200PG028000 sensor, that is commercially available from Gems Sensors & Controls, Plainville, Conn.; however, any suitable temperature sensors, pressure sensors and combined temperature and pressure sensors are contemplated for use in the fuel level meter system of the present application.

Figure 2:
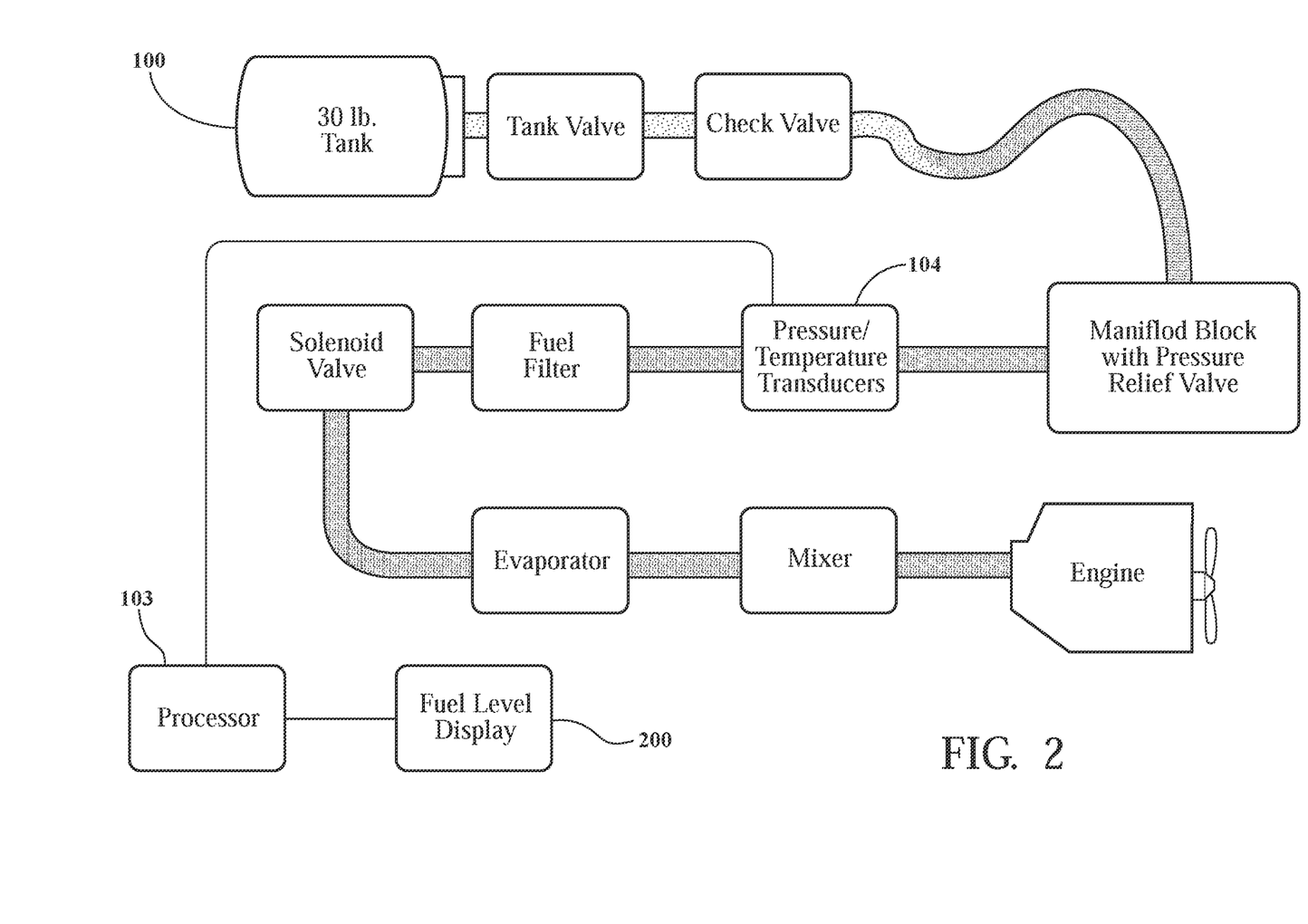
FIG. 2 is a block diagram of a fuel system which can use the fuel level meter disclosed in the present application.
Figure 3:
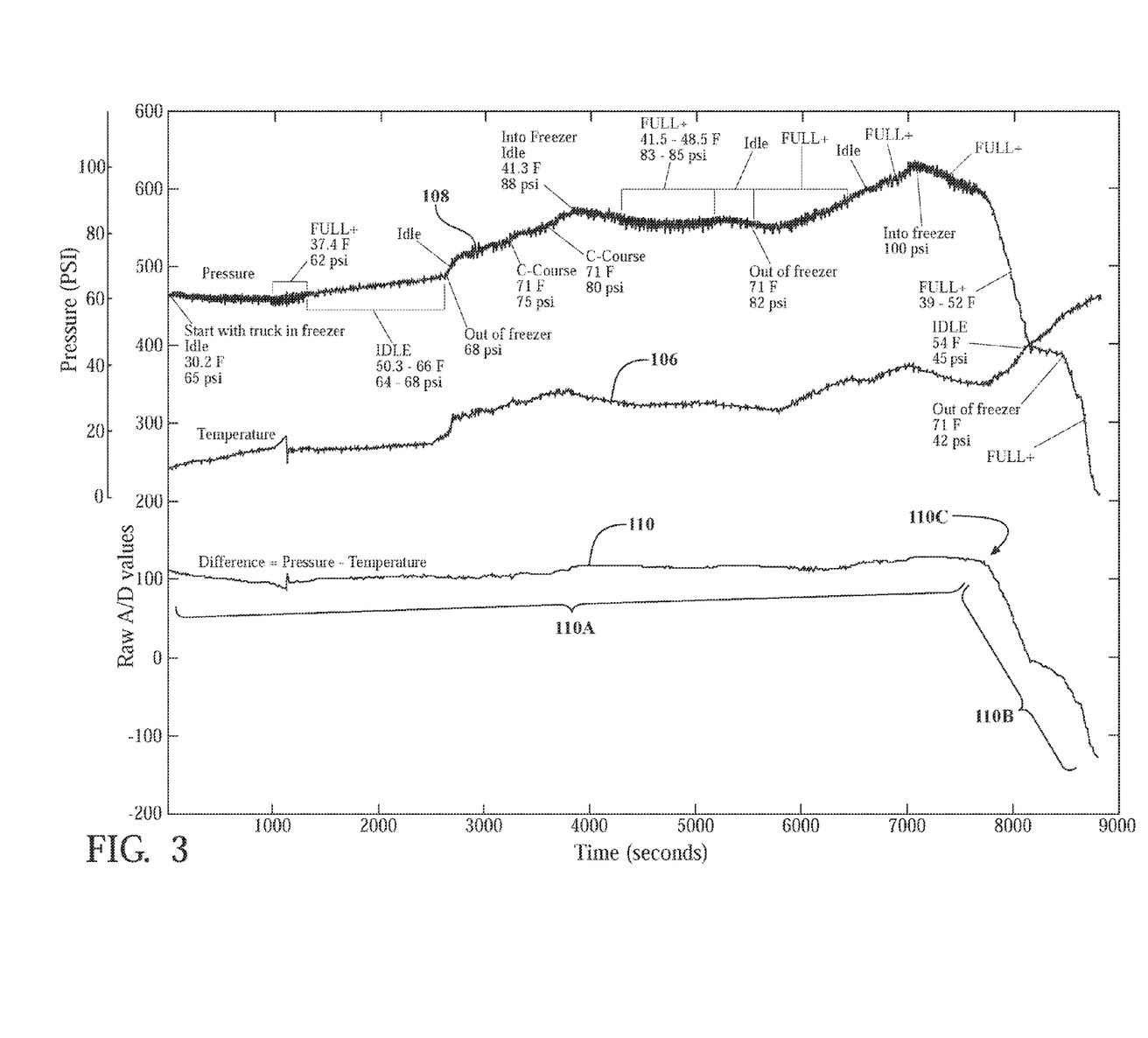
FIG. 3 is a graph of a measured pressure signal of liquid fuel in a liquid fuel tank, a measured temperature of liquid fuel in a liquid fuel tank and a difference signal generated by taking the difference of the temperature and pressure signals.

A fuel level signal, generated, for example, by a fuel level meter processor 103 by taking the difference between a measured pressure signal 108 and a measured temperature signal 106 representative of tank conditions, i.e., pressure-temperature (P–T) or temperature–pressure (T–P) is used for fuel level metering (see e.g. FIG. 3). Alternately, the temperature signal and pressure signal can be divided by one another to generate the fuel level signal, i.e., P/T or T/P. The processor 103 can be a dedicated fuel level meter processor or another processor that is provided on the lift truck 102. The present application is not to be limited by the fuel system block diagram as shown in FIG. 2 since the position of components can be moved within the system, for example the fuel filter can be placed before the sensor 104, or components can be moved and combined with one another, for example the fuel filter could be combined with the manifold block.

Due to the properties of gases [Gas law: PV=nRT where P=absolute pressure of gas, V=volume of gas, n=number of moles of gas, R=universal gas constant (189 J/kg K for LP), and T=absolute temperature], if there is sufficient propane in the tank 100, a normalized temperature signal 106 and a normalized pressure signal 108 are highly correlated to one another as shown in FIG. 3. In the illustrated embodiment, normalization is performed by using raw data from analog to digital (A/D) converters representative of an analog temperature signal and an analog pressure signal with the normalized values being used to generate the fuel level signal. The relationship between the temperature signal 106, the pressure signal 108 and the fuel level signal 110 may be illustrated by graphing these signals versus time to generate curves representative of the signals so that signal and curve may be used interchangeably herein.

In FIG. 3, the illustrated fuel level signal 110 is a difference signal, P−T, which embodiment will be described herein with the understanding that other relationships, such as T−P, P/T, T/P, can also be used in accordance with the teachings of the present application. The inventors of the present application have observed that when graphically illustrated, the resulting pressure curve 108 closely resembles the temperature curve 106 as long as the amount of propane in the tank is greater than about 9% to 12% of a full tank. While the pressure and temperature curves 108, 106 may appear jagged, the fuel level signal 110, which may be referred to herein as a difference signal or difference curve, is much smoother than either the pressure curve 108 or the temperature curve 106 and is relatively flat and fluctuations which can occur in the pressure curve 108 due to ambient temperature variations are substantially eliminated from the difference curve as illustrated. During the majority of the time the tank is emptying, the fuel level signal 110 does not change substantially, see 110A. It is only after the fuel in the tank has reached the final 9% to 12% of the fuel that the fuel level signal begins to change, see 110B. At that time, a point 110C in the difference curve indicating the emptying of the final portion of the fuel from the tank can be detected.

During this stage of tank emptying, i.e., below the 9% to 12% full point, changes or reductions in the amount of gas remaining in the tank (changes in n, the number of moles of gas in the gas law equation noted above) have a noticeable effect on the pressure and temperature signals 108, 106. The pressure and temperature signals 108, 106 become uncorrelated and the difference curve, the fuel level signal 110, begins to fall sharply. Because at this time the pressure curve 108 falls and the temperature curve 106 rises, the fall of the difference curve, the fuel level signal 110, is accentuated.

An LP tank having a 30 pound (13.6 kg) capacity is the industry standard and the 9% to 12% full point for such a standard tank equals about 16 minutes of normal running time for the lift truck 102. A variety of other tank sizes are available, however they are seldom used in the industry. If tank sizes other than the 30 pound (13.6 kg) capacity size are used, the fuel level meter system of the present application still works, but the final timing or remaining truck run time would change. That is, a smaller tank would result in less run time after the tank begins to run out of fuel while a larger tank would result in more run time after the tank begins to run out of fuel. Also, while normal run times for the final portion of fuel will be about the same for vehicles of a given vehicle model, the normal run times may vary for vehicles of different vehicle models so that normal run times may need to be determined for each vehicle model.

Figure 4:
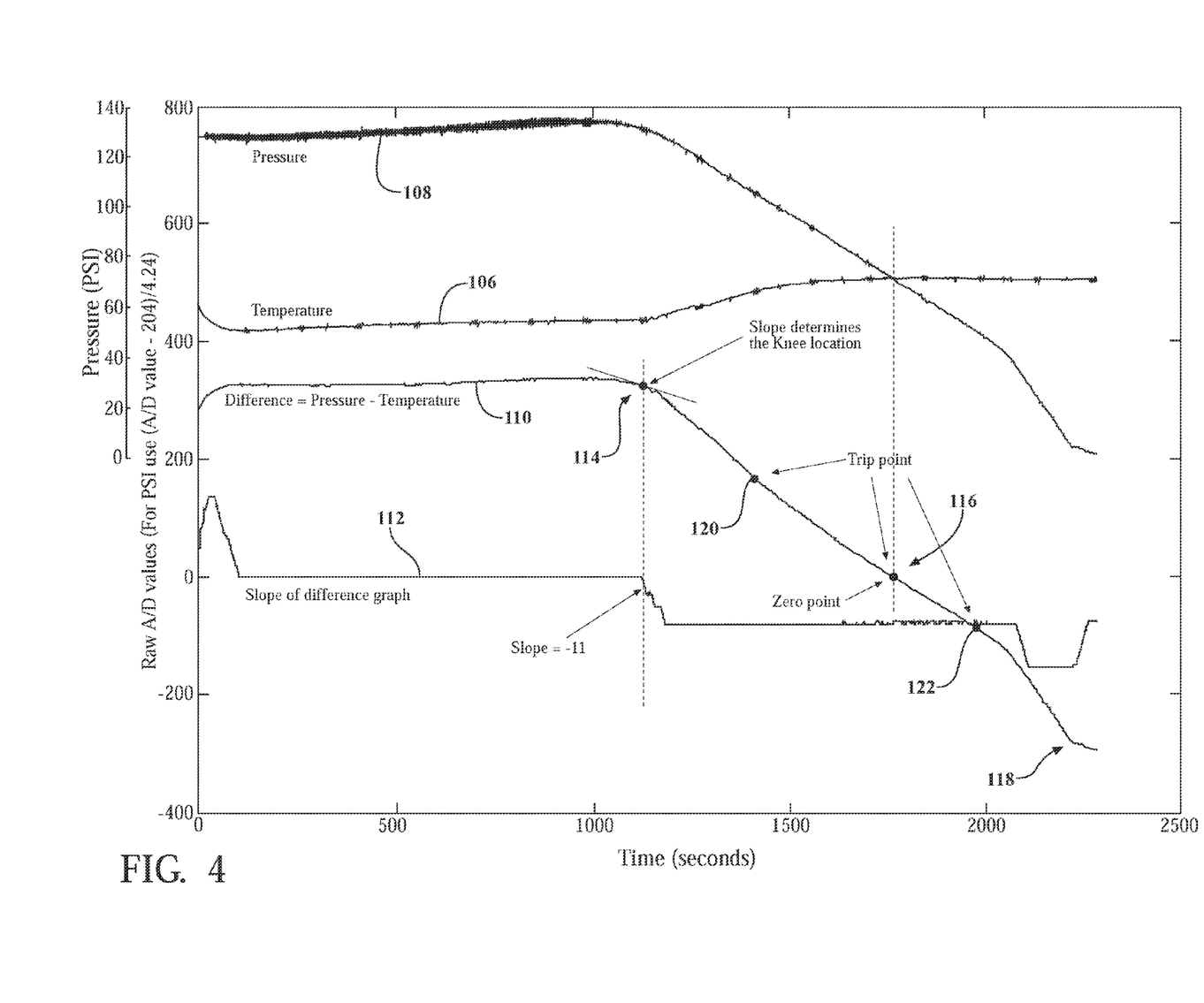
FIG. 4 is a graph of a measured pressure signal of liquid fuel in a liquid fuel tank, a measured temperature of liquid fuel in a liquid fuel tank, a difference signal generated by taking the difference of the temperature and pressure signals and a slope of the difference signal.

Changes in the difference curve, the fuel level signal 110, such as its slope and magnitude, are monitored to determine how much fuel remains in the tank, see the slope curve 112 in FIG. 4 which illustrates the slope of the difference curve, the fuel level signal 110, versus time. There is a first point in the difference curve, the fuel level signal 110, where changes of a predefined amount over time occur as the difference curve starts to turn down. This first point defines a knee 114 in the difference curve, the fuel level signal 110. In the illustrated embodiment, the knee 114 is defined as the point at which changes in the difference curve, the fuel level signal 110, or the slope of the difference curve reach −11 A/D units in a 20 second time period. The knee 114 can be detected because it occurs when the pressure and temperature signals 108, 106 become uncorrelated and the difference curve, the fuel level signal 110, begins to fall sharply. As noted above, these changes are due to the reduced amount of fuel in the tank.

In the illustrated embodiment, the difference curve, the fuel level signal 110, is sampled every 20 milliseconds with the samples being averaged every 2 seconds. The resulting value is compared to the value determined 20 seconds before to determine the change of the fuel level signal 110 or slope of the difference curve. It is noted that the knee can be defined earlier or later, i.e., at a slope of less than −11 A/D units/20 sec or at a slope or more than −11 A/D units/20 sec (e.g. between −9 and −11 A/D units/20 sec) or at a slope or more than −11 A/D units/20 sec (e.g. between −11 and −13 A/D units/20 sec), depending upon system requirements and preferences.

A second point along the difference curve, the fuel level signal 110, is a zero point 116, i.e., the point at which the pressure curve 108 crosses the temperature curve 106 in A/D units in the illustrated embodiment. The inventors of the present application have observed that the zero point 116 normally is at about the midpoint of the portion of the downward sloping difference curve, the fuel level signal 110, that extends between the knee 114 and the end point or tank empty point 118 of the difference curve. The zero point 116 also serves as a reference point for predicting how far down the difference curve, the fuel level signal 110, will extend beyond the knee 114, i.e., the difference curve generally extends as many A/D units beyond the zero point 116 to reach the tank empty point 118 as the difference curve extends from the knee 114 to reach the zero point 116.

Fuel level states exhibited by a fuel level meter or display are determined by using the knee 114, the zero point 116 and the tank empty point 118 to calculate set points along the downward sloping portion of the difference curve, the fuel level signal 110. The set points define trip locations along the difference curve at which the display is switched to a higher or lower fuel level indication. In currently used fuel level displays, two light sources, such as light emitting diodes (LEDs), are used to indicate fuel level. A green LED is illuminated until a pressure switch monitoring tank pressure falls below a given pressure, for example 60 pounds per square inch (PSI). Under normal ambient temperatures, a tank pressure of 60 PSI indicates that enough fuel remains in the tank for about 2 to 3 minutes of truck operation. When tank pressure goes below the given pressure, the green LED is extinguished and a yellow LED is illuminated. Unfortunately, the 2 to 3 minutes of remaining operating time can be reduced when the truck is operating in elevated temperatures and can be increased when the truck is operating in lowered temperatures. Thus, depending on ambient temperature, the truck runs out of fuel before it is expected or the truck is refueled before it is necessary to refuel it, possibly well before refueling is necessary, 15 minutes or more.

The fuel level meter of the present application enables an operator to be alerted more accurately and over a longer period of remaining operating time to tank empty. While almost infinite alerting schemes using lights, analog meters, digital meters, LCD displays, and the like can be imagined, a novel fuel level display 200 is shown in FIG. 2 as being connected to the fuel level meter processor 103 and illustrated in more detail in FIG. 5. The fuel level display 200 has four light sources, which are conveniently LEDs, although other light sources can be used. In the illustrated embodiment, the four light sources comprise three green LEDs 202, 204, 206 and one yellow LED 208. As illustrated, the LEDs are arranged vertically in a column with the yellow LED being the bottommost one of the four LEDs. However, it will be appreciated that any arrangement of the lights may be used, such as a horizontal arrangement. Similarly, different colors of light may be used, provided an operator of the vehicle can understand what level of fuel is being signaled. In the embodiment depicted, prior to reaching the knee 114 of the difference curve, the fuel level signal 110, all four LEDs 202-208 are illuminated to indicate that sufficient fuel is in the tank 100 to permit truck operation for an extended period of time. As illustrated, this LEVEL 4 display indicates that more than about 16 minutes of truck operating time remains. Upon reaching the knee 114 of the difference curve, the fuel level signal 110, the top LED 202 (the top one of the three green LEDs 202, 204, 206) is extinguished and the remaining three LEDs 204-208, two green LEDs and one yellow LED, remain illuminated. This LEVEL 3 display indicates that about 16 minutes of truck operating time remains.

Figure 5:
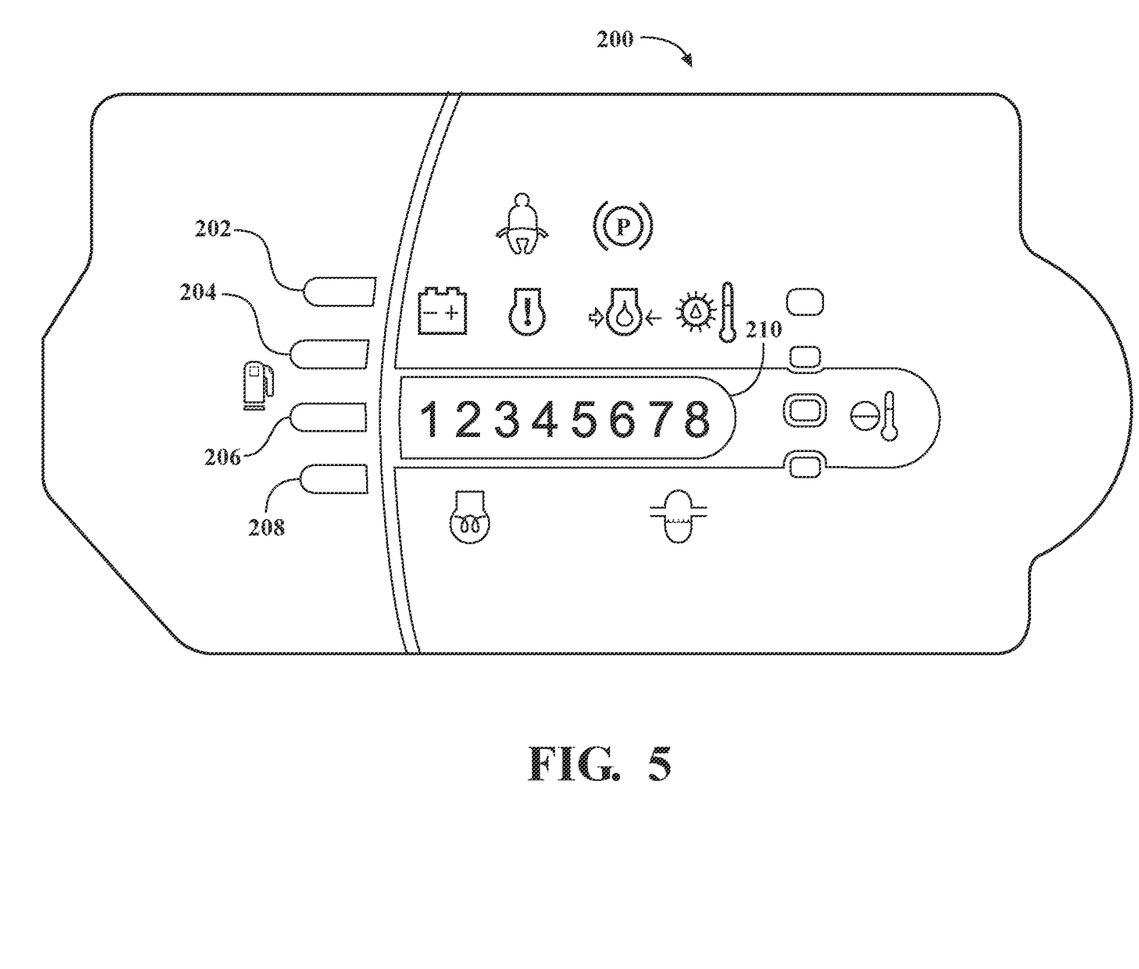
FIG. 5 illustrates an improved fuel level display for the fuel level meter system disclosed in the present application.

As noted above, a second point on the difference curve, the fuel level signal 110, is defined when the difference curve reaches zero, i.e., the zero point 116. While the second point could be used as the next change for the fuel level display 200, to provide more increments in the display of run time remaining, four levels are used in the illustrated embodiment. To that end, a third point 120 is defined on the difference curve 110. The third point 120 is positioned approximately midway between the knee 114, i.e., the first point of the difference curve, and the midpoint or zero point 116 of the difference curve, i.e., the second point of the difference curve. When the difference curve, the fuel level signal 110, reaches the third point 120, the next to the top green LED 204 is also extinguished and the two bottom LEDs 206, 208, the bottommost green LED and the yellow LED, remain illuminated. This LEVEL 2 display indicates that about 12 minutes of truck operating time remains.

Figure 6:
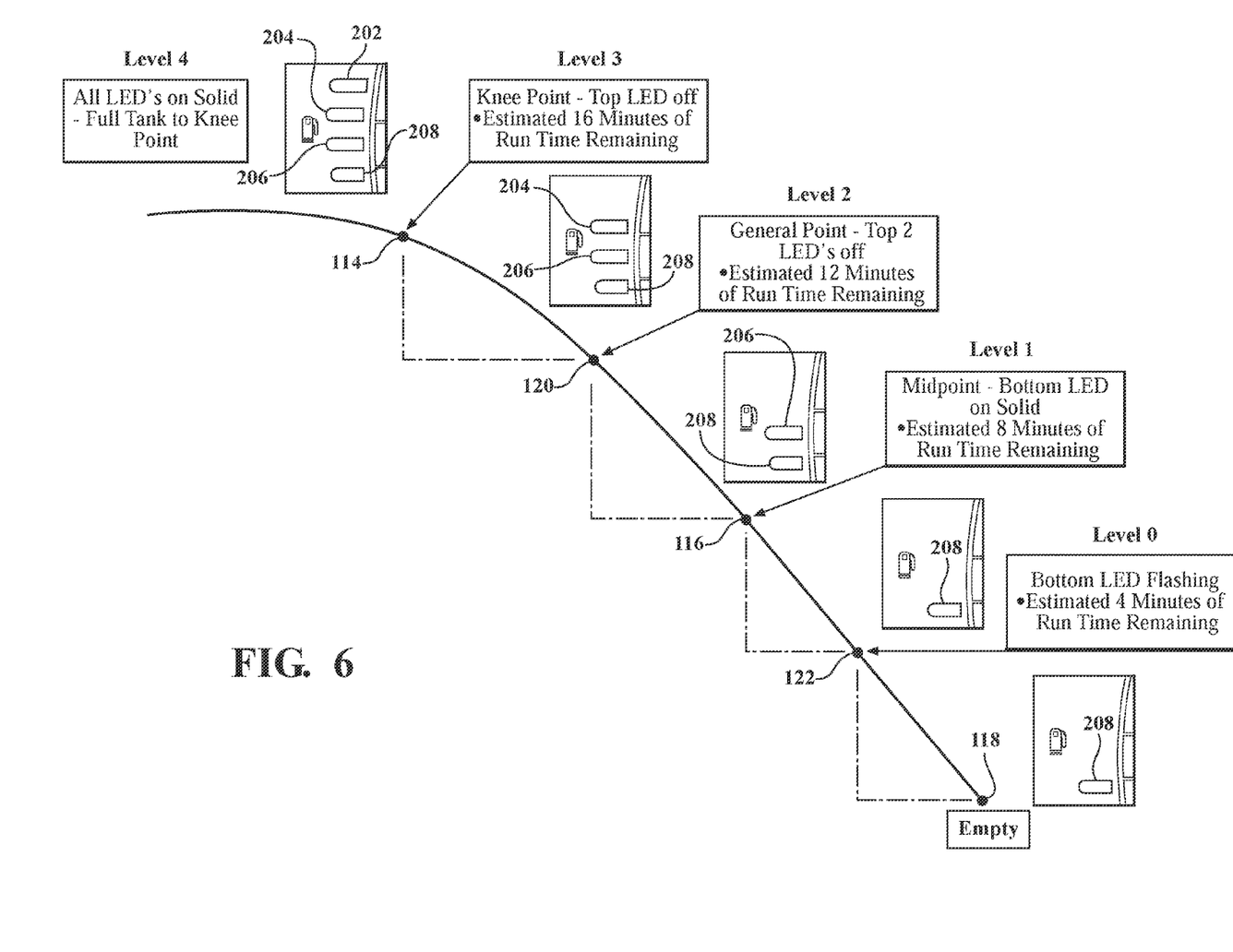
FIG. 6 summarizes various display levels showing a composite of a difference signal curve and fuel level displays for the fuel level meter system disclosed in the present application.

Upon reaching the second point, i.e., the midpoint or zero point 116, of the difference curve, the bottommost green LED 206 is extinguished and the single bottom LED 208, the yellow LED, remains illuminated. This LEVEL 1 display indicates that about 8 minutes of truck operating time remains. Upon reaching a fourth point 122 positioned between the midpoint or zero point 116 and the tank empty point 118 of the difference curve, the bottom yellow LED is flashed, an optional audible alarm is activated and "Out Of Fuel" may be scrolled on a combination numerical/text display 210. This LEVEL 0 display indicates that about 4 minutes of truck operating time remains. The fourth point 122 is selected to be approximately midway between the second point 120 and the end point 118. Advantageously, the fourth point 122 is selected to be approximately midway between the second point 120 and the end point 118 less a predetermined offset, in order to maintain even spacing in time of the set points along the difference curve, the fuel level signal 110. In a working embodiment, an offset of 25 A/D units was used so that the fourth point 122 was spaced at the midpoint between the second point 120 and the end point 118 −25 A/D units. These levels and displays are summarized in FIG. 6.

Operation of the illustrated embodiment of the fuel level meter of the present application will now be described with reference to a fuel level meter flow chart shown in FIG. 7. Upon key-on of the lift truck 102, fuel level meter operation begins at 300. At 302, a determination of whether the fuel tank 100 was changed since the truck 102 was last operated is made so that an accurate representation of fuel level can be provided to the operator by operation of the fuel level display 200, see 400 of FIG. 8A. The last data stored just before key-off is retrieved from nonvolatile memory and if the fuel tank pressure is at least 35 PSI greater than the last stored fuel tank pressure, it is concluded that a full fuel tank has been installed on the truck 102, the set points along the difference curve, the fuel level signal 110, are determined for the full tank, the fuel level display 200 is set to LEVEL 4 and the tank change test is ended, see 402, 404, 406, 407.

Figure 8A:
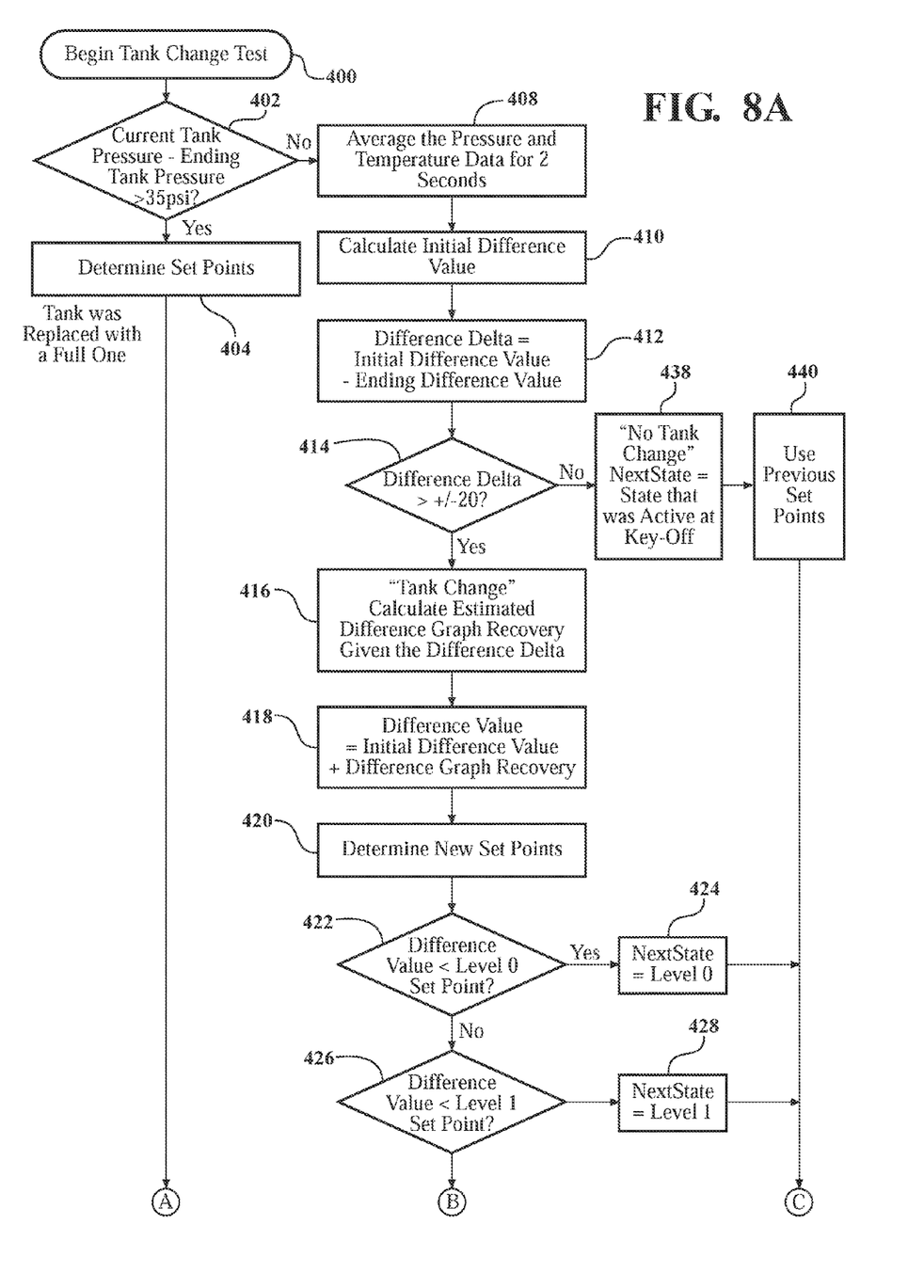
FIGS. 8A and 8B together form a flow chart of an embodiment of a tank change test for operation of the fuel level meter system disclosed in the present application.

If tank pressure is not 35 PSI greater than the last stored pressure, temperature and pressure data are taken and averaged for 2 seconds; an initial fuel level signal 110 (difference signal level value as illustrated) is calculated; and a fuel level signal 110 delta (difference value delta) is calculated by subtracting the ending fuel level signal 110 (ending difference value retrieved from nonvolatile memory) from the initial fuel level signal 110 (difference value), 408, 410, 412.

Figure 10:
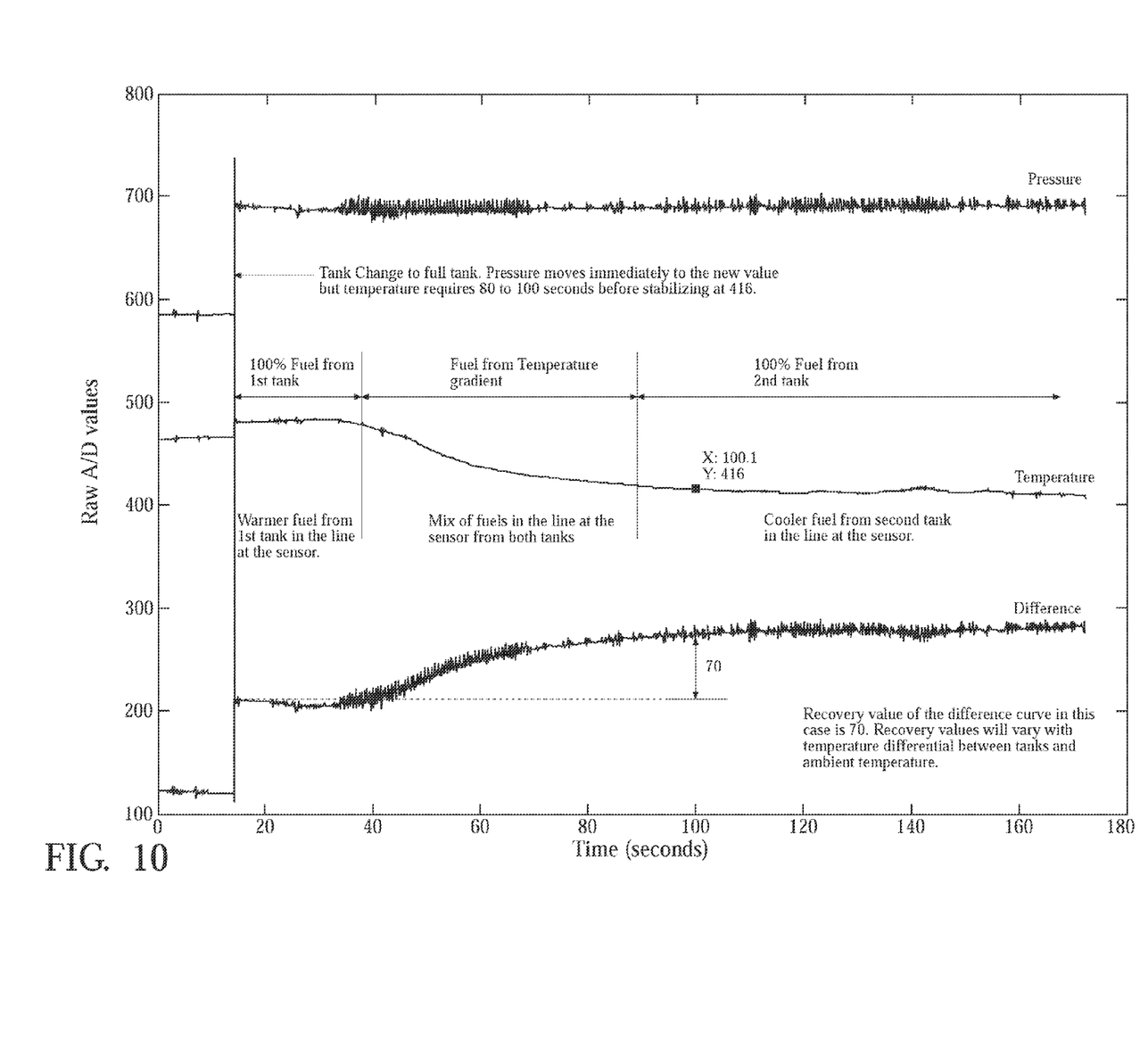
FIG. 10 graphically illustrates how the pressure, temperature and difference signal values change on replacing a first fuel tank with a second fuller fuel tank.
Figure 11:
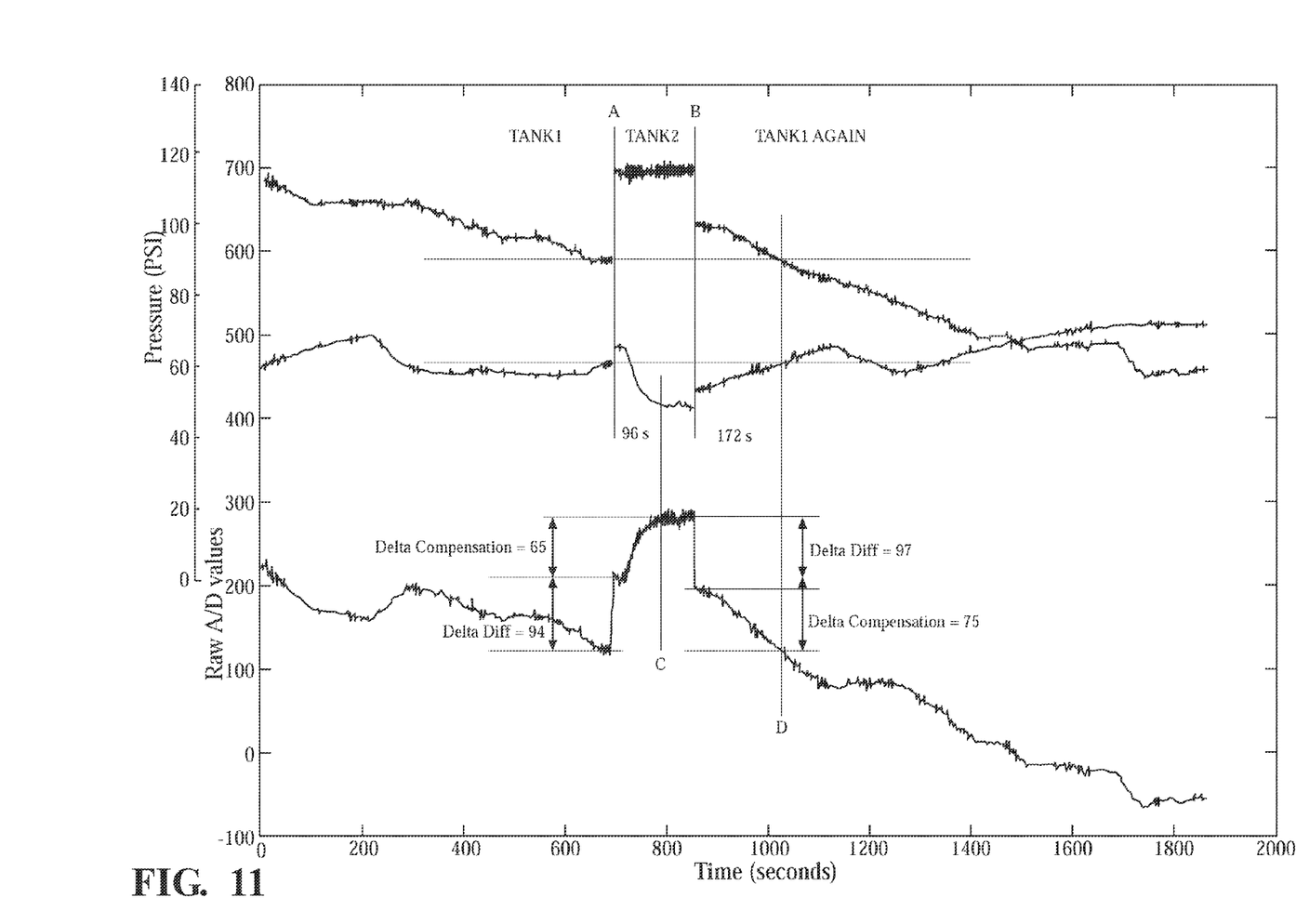
FIG. 11 graphically illustrates how the pressure, temperature and difference signal values change on replacing a first fuel tank with a second fuller full fuel tank and then on changing the second fuel tank back to the first fuel tank.

Pressure and temperature dynamics due to tank changes are illustrated in FIG. 10 for a change to a full tank and FIG. 11 illustrates pressure and temperature dynamics for a change from an original tank to a full tank and then back to the original tank. If the fuel level signal 110 delta (difference value delta) is greater than ±20 A/D counts of a 10 bit A/D converter count, an estimated fuel level signal recovery (difference value recovery) is determined and the fuel level signal 110 (difference value) is set equal to the initial fuel level signal 110 (initial difference signal) plus the estimated initial fuel level signal 110 recovery (difference value recovery), the resulting fuel level signal 110 (resulting difference value), and new set points are determined, 416, 418, 420. The estimated fuel level signal recovery will be determined empirically and placed into a lookup table that can then be accessed based on fuel level signal 110 delta (difference value delta). The difference valve recovery accounts for an expected change in the difference curve as new fuel moves from the tank 100 to the sensor 104. Transit times range from 80 to 100 seconds depending upon fuel demand and a tank change from empty to full could result in a difference curve increase of up to 70 over that transit period with a 30 pound tank.

Figure 8B:
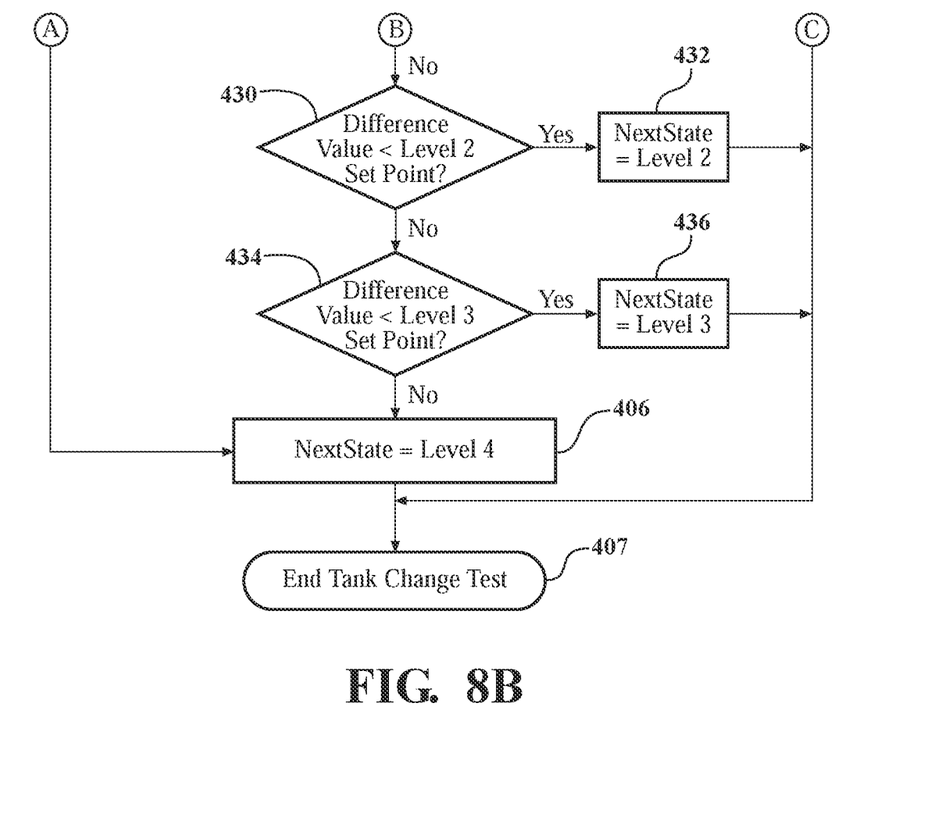

If the resulting fuel level signal 110 (resulting difference value) is less than the fourth point 122 (level zero set point), the fuel level display 200 is set to LEVEL 0, 422, 424. If not, but the resulting fuel level signal 110 (resulting difference value) is less than the second point 116 (level one set point), the fuel level display 200 is set to LEVEL 1, 426, 428. If not, but the resulting fuel level signal 110 (resulting difference value) is less than the third point 120 (level two set point), the fuel level display 200 is set to LEVEL 2, 430, 432. If not, but the resulting fuel level signal 110 (resulting difference value) is less than the first point 114 (level three set point), the fuel level display 200 is set to LEVEL 3. If not, the fuel level display is set to LEVEL 4, 406.

If the fuel level signal 110 delta (difference value delta) is not within ±20 A/D counts of a 10 bit A/D converter count, then it is concluded that no tank change was made, the previous set points are used and the tank change test is ended, 438, 440, 407.

After the tank change test sequence is finished, see 407, fuel level meter operation continues by averaging the pressure and temperature signals for 2 seconds and, in the illustrated embodiment, determining the fuel level signal 110 (difference value) by subtracting the temperature signal in A/D units from the pressure signal in A/D units, 304, 306. After a tank change, it is possible that the tank valve will not be opened. To determine whether that has happened, a check is made for a tank valve closed condition at 308.

Figure 9:
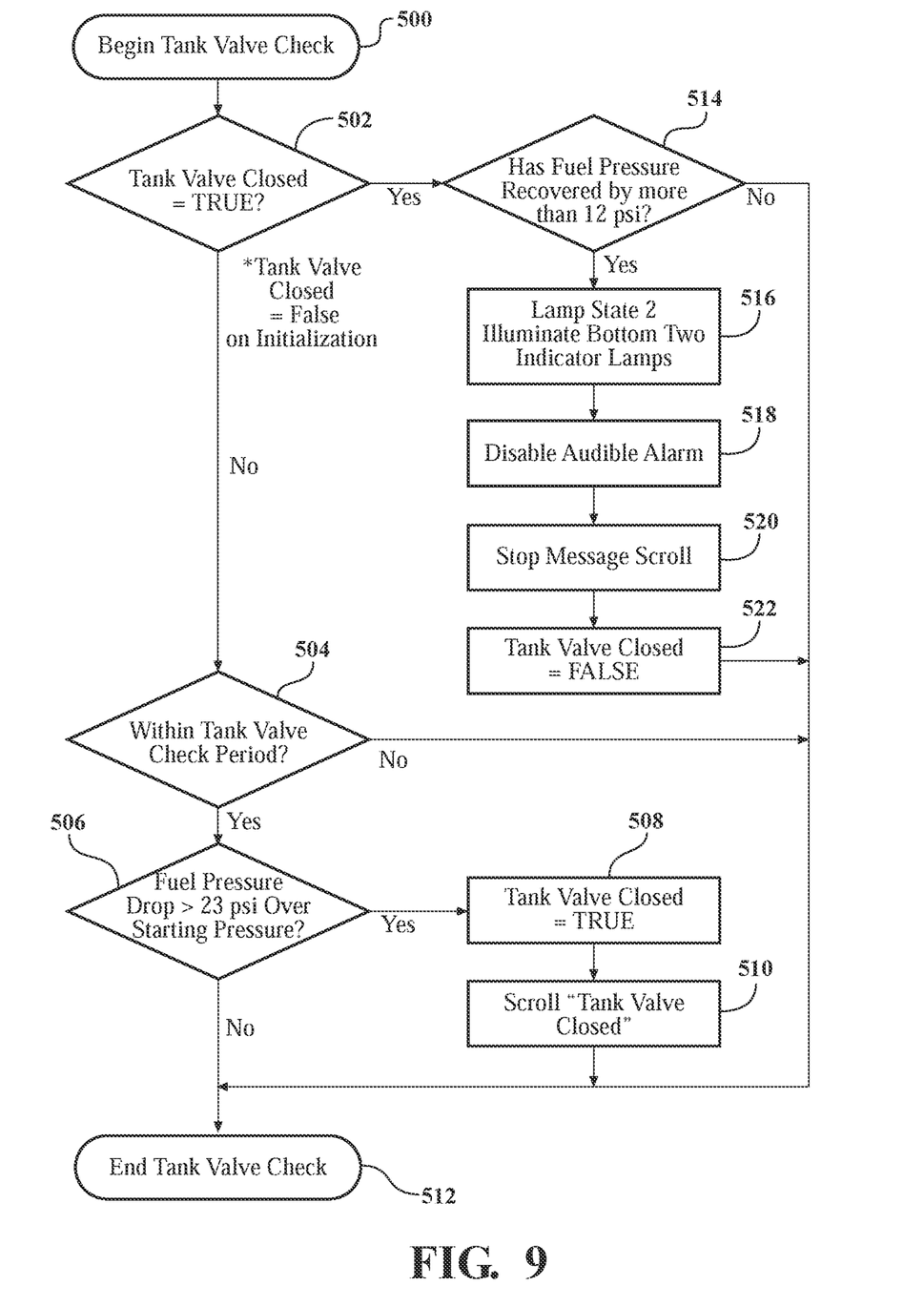
FIG. 9 is a flow chart of an embodiment of a tank valve check for operation of the fuel level meter system disclosed in the present application.

An illustrated embodiment of a tank valve check routine is begun at 500 in FIG. 9. A tank valve closed flag, which is false upon entering the tank valve closed routine, is checked to see if the flag has been set to true at 502. If the tank valve closed flag is false and a timer indicating elapsed time within the tank valve check routine has not expired, a check is made to see if the pressure in the tank has dropped by greater than 23 PSI over the starting pressure at 506. If so, the tank valve closed flag is set to true and the operator is advised that the tank valve is closed, for example by scrolling "Tank Valve Closed" on the combination numerical/text display 210 of the fuel level display 200, 508, 510. An optional audible alarm can also be used. The tank valve check routine is then ended at 512. If the tank valve closed flag is false, the timer indicating elapsed time within the tank valve check routine has not expired and the pressure in the tank has not dropped by greater than 23 PSI over the starting pressure at 506, the tank valve check routine is ended at 512.

If the tank valve closed flag is true indicating that the tank valve is closed, the fuel pressure in the tank is checked to see if it has recovered by more than 12 PSI over the starting pressure, 502, 514. If the fuel pressure has not recovered by more than 12 PSI from the starting pressure, the tank valve check routine is ended at 512. If the fuel pressure has recovered by more than 12 PSI from the starting pressure, the fuel level display 200 is set to LEVEL 2, the optional audible alarm is disabled, the "Tank Valve Closed" message is stopped, the tank valve closed flag is set to false and the tank valve check routine is ended, 516, 518, 520, 522, 512.

When the tank valve check routine has ended 512 with an indication that the valve is closed, the fuel level display 100 is activated to display a LEVEL 5 alert where all four LEDs 202, 204, 206, 208 are flashed, an audible alert, if provided, is sounded and "Tank Valve Closed" is scrolled on the combination numerical/text display 210, 310, and fuel level meter operation returns to 304.

Figure 7:
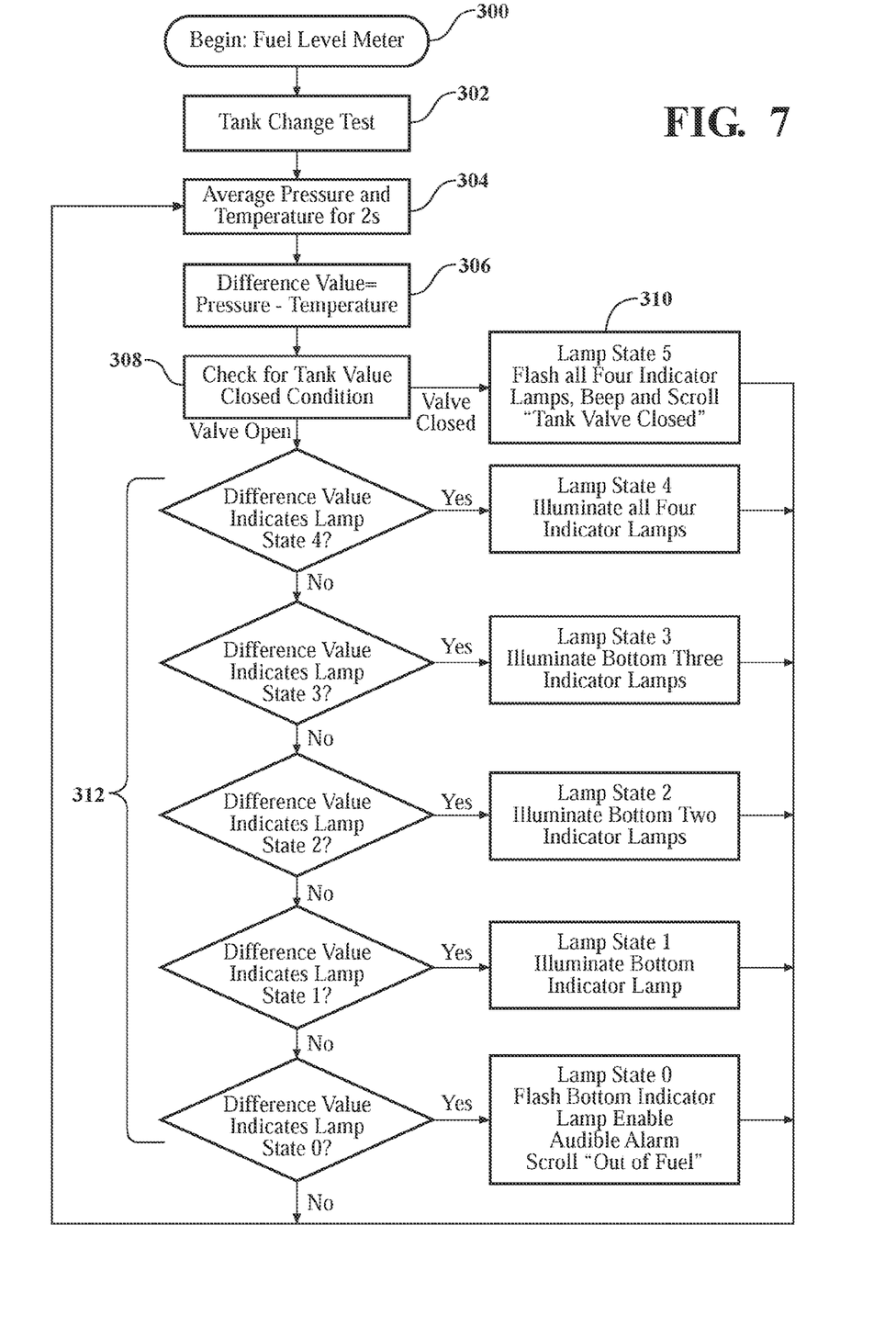
FIG. 7 is flow chart of an embodiment for operation of the fuel level meter system disclosed in the present application.

If the tank valve closed flag is false, indicating that the tank valve is open, the fuel level signal 110 (difference value) is used to determine how to control the fuel level display 200, for example as illustrated at 312 in FIG. 7. The display control illustrated at 312 is comparable to the display decisions made in FIG. 8 as described above.

Having thus described the invention of the present application in detail and by reference to embodiments thereof, it will be apparent that modifications and variations are possible without departing from the scope of the invention defined in the appended claims.

The invention claimed is:

1. A method for measuring pressurized liquid fuel level in a fuel tank used on an industrial vehicle comprising:
measuring the pressure of the fuel to generate a pressure signal;
measuring the temperature of the fuel to generate a temperature signal;
determining a fuel level signal from said pressure signal and said temperature signal by doing one of: subtracting the temperature signal from the pressure signal (P−T) and subtracting the pressure signal from the temperature signal (T−P);
detecting changes in said fuel level signal over time;
identifying a first point of said fuel level signal indicating approaching emptying of the tank when said pressure signal and said temperature signal become uncorrelated so that changes in said fuel level signal exceed a given value; and
signaling said approaching emptying of the tank to an operator of the vehicle in response to identifying said first point.

2. The method of claim 1 further comprising:
monitoring said fuel level signal after said fuel level signal reaches said first point;
identifying at least one additional point of said fuel level signal beyond said first point, said at least one additional point indicating advancement of the approaching emptying of the tank, said at least one additional point of said fuel level signal being approximately half of the fuel level signal at the first point; and
wherein signaling the approaching emptying of the tank further comprises signaling said at least one additional point to an operator of the vehicle.

3. The method of claim 2 further comprising selecting said at least one additional point of said fuel level signal beyond said first point to be where said temperature signal and said pressure signal are substantially equal to one another, and defining said point as a second point of the fuel level signal.

4. The method of claim 3 further comprising setting said second point of said fuel level signal as a midpoint of a terminal portion of said fuel level signal that extends between said first point and an end point of said fuel level signal corresponding to an empty tank.

5. The method of claim 4 further comprising selecting at least one additional point of said fuel level signal between said first point and said second point indicating advancement of the approaching emptying of the tank; and
wherein signaling the approaching emptying of the tank further comprises signaling said at least one additional point between said first point and said second point.

6. The method of claim 5 wherein selecting said at least one additional point of said fuel level signal between said first point and said second point comprises selecting a third point that is approximately midway between said first point and said second point.

7. The method of claim 6 further comprising selecting at least one additional point of said fuel level signal between said second point and said end point indicating advancement of the approaching emptying of the tank; and
wherein signaling the approaching emptying of the tank further comprises signaling said at least one additional point of said fuel level signal between said second point and said end point.

8. The method of claim 7 wherein selecting at least one additional point of said fuel level signal between said second point and said end point of said fuel level signal comprises selecting a fourth point that is approximately midway between said second point and said end point plus a given percentage of a value of said fuel level signal between said second point and said end point of said fuel level signal.

9. The method of claim 2 wherein identifying at least one additional point of said fuel level signal beyond said first point comprises:
  identifying three additional points of said fuel level signal beyond said first point, the three additional points indicating progressive advancement of the approaching emptying of the tank; and
  wherein signaling the approaching emptying of the tank further comprises signaling the three additional points of said fuel level signal.

10. The method of claim 1 wherein the pressure signal comprises counts from an analog-to-digital converter and the temperature signal comprises counts from an analog-to-digital converter and subtracting the temperature signal from the pressure signal comprises subtracting the counts from one another.

11. The method of claim 1 wherein said first point corresponds to an amount of liquid fuel remaining in the tank.

12. A pressurized liquid fuel level meter system for use on an industrial vehicle comprising:
  a display comprising:
  a series of at least three light sources arranged in a generally vertical column; and
  a bottommost one of said at least three light sources being of a first color and light sources above said bottommost one of said at least three light sources being of a second color; and wherein the pressurized liquid fuel level meter system further comprises:
  at least one sensor for measuring the pressure of the fuel in a fuel tank to generate a pressure signal and for measuring the temperature of the fuel to generate a temperature signal;
  a fuel level meter processor receiving said pressure and temperature signals and determining a fuel level signal therefrom by doing one of: subtracting the temperature signal from the pressure signal (P−T) and subtracting the pressure signal from the temperature signal (T−P);
  said processor detecting changes in said fuel level signal over time;
  said processor identifying a first point of said fuel level signal indicating approaching emptying of the tank when said pressure signal and said temperature signal become uncorrelated so that changes in said fuel level signal exceed a given value; and
  said processor signaling said approaching emptying of the tank to an operator of the vehicle in response to identifying said first point using said display.

13. The pressurized liquid fuel level meter system of claim 12 wherein said series of at least three light sources comprises four light sources.

14. The pressurized liquid fuel level meter system of claim 12 wherein said first color is yellow and said second color is green.

15. The pressurized liquid fuel level meter system of claim 14 wherein said light sources are light emitting diodes (LEDs).

16. The pressurized liquid fuel level meter system of claim 12 wherein said at least one sensor comprises one dual sensing sensor sensing both temperature and pressure.

17. The pressurized liquid fuel level meter system of claim 12 wherein said first point corresponds to an amount of liquid fuel remaining in the tank.

18. The pressurized liquid fuel level meter system of claim 12 wherein a remaining run time of the vehicle corresponding to the first point of said fuel level signal is dependent on the size of the tank.

19. A method for measuring pressurized liquid fuel level in a fuel tank used on an industrial vehicle comprising:
  measuring the pressure of the fuel to generate a pressure signal;
  measuring the temperature of the fuel to generate a temperature signal;
  determining a fuel level signal from said pressure signal and said temperature signal by doing one of: subtracting the temperature signal from the pressure signal (P−T) and subtracting the pressure signal from the temperature signal (T−P);
  detecting changes in said fuel level signal over time;
  identifying a first point of said fuel level signal indicating approaching emptying of the tank when changes in said fuel level signal exceed a given value over time; and
  signaling said approaching emptying of the tank to an operator of the vehicle in response to identifying said first point.

20. The method of claim 19 wherein said first point corresponds to an amount of liquid fuel remaining in the tank.

21. A pressurized liquid fuel level meter system for use on an industrial vehicle comprising:
  a display comprising:
  a series of at least three light sources arranged in a generally vertical column; and
  a bottommost one of said at least three light sources being of a first color and light sources above said bottommost one of said at least three light sources being of a second color; and wherein the pressurized liquid fuel level meter system further comprises:
  at least one sensor for measuring the pressure of the fuel in a fuel tank to generate a pressure signal and for measuring the temperature of the fuel to generate a temperature signal;
  a fuel level meter processor receiving said pressure and temperature signals and determining a fuel level signal therefrom by doing one of: subtracting the temperature signal from the pressure signal (P−T) and subtracting the pressure signal from the temperature signal (T−P);
  said processor detecting changes in said fuel level signal over time;
  said processor identifying a first point of said fuel level signal indicating approaching emptying of the tank when changes in said fuel level signal exceed a given value over time; and
  said processor signaling said approaching emptying of the tank to an operator of the vehicle in response to identifying said first point using said display.

22. The pressurized liquid fuel level meter system of claim 21 wherein said first point corresponds to an amount of liquid fuel remaining in the tank.

* * * * *